US009180981B2

(12) United States Patent
López Urdiales

(10) Patent No.: US 9,180,981 B2
(45) Date of Patent: Nov. 10, 2015

(54) POD FOR SPACE OR NEAR-SPACE FLIGHTS

(75) Inventor: José Mariano López Urdiales, Barcelona (ES)

(73) Assignee: ZERO2INFINITY, S.L., Cerdanyola Del Valles (ES)

(*) Notice: Subject to any disclaimer, the term of this patent is extended or adjusted under 35 U.S.C. 154(b) by 321 days.

(21) Appl. No.: 13/509,611

(22) PCT Filed: Nov. 13, 2009

(86) PCT No.: PCT/EP2009/065135
§ 371 (c)(1),
(2), (4) Date: May 13, 2012

(87) PCT Pub. No.: WO2011/057669
PCT Pub. Date: May 19, 2011

(65) Prior Publication Data
US 2012/0228434 A1  Sep. 13, 2012

(51) Int. Cl.
B64G 1/12 (2006.01)
B64G 1/00 (2006.01)
B64G 1/62 (2006.01)
B64G 1/58 (2006.01)
B64G 1/60 (2006.01)
B64G 1/22 (2006.01)

(52) U.S. Cl.
CPC ...... B64G 1/12 (2013.01); B64G 1/002 (2013.01); B64G 1/005 (2013.01); B64G 1/62 (2013.01); B64G 1/58 (2013.01); B64G 1/60 (2013.01); B64G 2001/224 (2013.01)

(58) Field of Classification Search
CPC .............. B64B 1/22; B64B 1/48; B64G 1/12; B64G 1/62; B64G 1/005; B64G 1/002; B64G 1/60; B64G 2001/224
USPC .......... 244/2, 29, 30, 31, 32, 139, 140, 158.1, 244/158.3, 158.9, 159.1, 159.2, 12.2, 23 C, 244/113, 146, 151 B, 172.1, 171.9
See application file for complete search history.

(56) References Cited

U.S. PATENT DOCUMENTS 2,829,846 A * 4/1958 Keiper ........................ 244/23 C
2,865,581 A   12/1958 Froehlich
2,950,881 A    8/1960 Schwoebel
2,961,204 A * 11/1960 Rayfield et al. ........... 244/138 R
(Continued)

FOREIGN PATENT DOCUMENTS

EP      0470916 B1    12/1992
WO  WO2011/057669 A1   5/2011

OTHER PUBLICATIONS

Kudriavtsev, Vladimir, et al. "Da Vinci X-Prize Space Project—Mission Analysis." Proceedings of 3rd International Symposium: Atmospheric Re-entry Vehicles and Systems. Arcachon, France. Mar. 24-27, 2003.*

(Continued)

Primary Examiner — Philip J Bonzell
Assistant Examiner — Michael Kreiner
(74) Attorney, Agent, or Firm — Ostrolenk Faber LLP

(57) ABSTRACT

A pod for flights to and/or from space or near-space, including a pressurized body for hosting passengers, the pressurized body having a substantially ring-like shape provided around a central axis and having a central opening, wherein the pressurized body includes one or more windows.

24 Claims, 9 Drawing Sheets

(56) References Cited

U.S. PATENT DOCUMENTS

| | | | |
|---|---|---|---|
| 2,993,663 A * | 7/1961 | Froehlich et al. | 244/31 |
| 3,072,367 A * | 1/1963 | Evanick et al. | 244/32 |
| 3,077,779 A * | 2/1963 | Froehlich et al. | 73/864.91 |
| 3,079,113 A * | 2/1963 | Meyer, Jr. | 244/140 |
| 3,081,967 A * | 3/1963 | Church | 244/31 |
| 3,090,585 A * | 5/1963 | Church | 244/99 |
| 3,093,346 A | 6/1963 | Faget et al. | |
| 3,141,640 A * | 7/1964 | Sutliff et al. | 244/138 R |
| 3,270,908 A * | 9/1966 | Faget et al. | 220/668 |
| 3,390,853 A * | 7/1968 | Wykes | 244/113 |
| 3,484,060 A * | 12/1969 | Trupp | 244/53 R |
| 3,568,955 A | 3/1971 | McDevitt | |
| 3,702,688 A | 11/1972 | Faget | |
| 4,014,483 A * | 3/1977 | MacNeill | 244/5 |
| 4,326,681 A * | 4/1982 | Eshoo | 244/30 |
| 4,619,422 A | 10/1986 | Petrehn | |
| 4,685,640 A * | 8/1987 | Warrington et al. | 244/29 |
| 5,683,060 A * | 11/1997 | Iturralde | 244/23 C |
| 5,967,459 A * | 10/1999 | Hayashi | 244/32 |
| 6,010,093 A * | 1/2000 | Paulson | 244/24 |
| 6,016,991 A * | 1/2000 | Lowe, Jr. | 244/5 |
| 6,264,144 B1 * | 7/2001 | Thornton | 244/159.2 |
| 7,295,884 B1 | 11/2007 | Spexarth | |
| 2006/0163434 A1 | 7/2006 | Patel | |

OTHER PUBLICATIONS

"Da Vinci X Prize Team Summary Sheet." [Anonymous]. Published Aug. 2004. Retrieved from <www.davinciproject.com/documents/Canadian_da_Vinci_Project_Team_Summary_Aug_2004_V6.0.pdf> on Dec. 4, 2014.*

J. Lopez-Urdiales, "The role of Balloons in the future development of Space Tourism", IAC-02-IAA.1.3.02, 53rd International Astronautical Congress, Oct. 10-19, 2002, Houston.

International Preliminary Report on Patentability for the International Application No. PCT/EP2009/065135, May 15, 2012, The International Bureau of WIPO, 34, chemin des Colombettes, 1211 Geneva 20, Switzerland.

International Search Report for the International Application No. PCT/EP2009/065135, Jun. 17, 2010, European Patent Office, P. B. 5818 Patentlaan 2, 2280 HV Rijswijk, Netherlands.

Gang, et al., Development of Flexible Thermal Protection for System Inflatable Re-entry Vehicles, College of Aerospace and Material Engineering, National University of Defense Technology, Changsha, Jun. 2003, pp. 5-12, China Academic Journal Electronic Publishing House, Beijing, China (English language abstract included on first page of document).

* cited by examiner

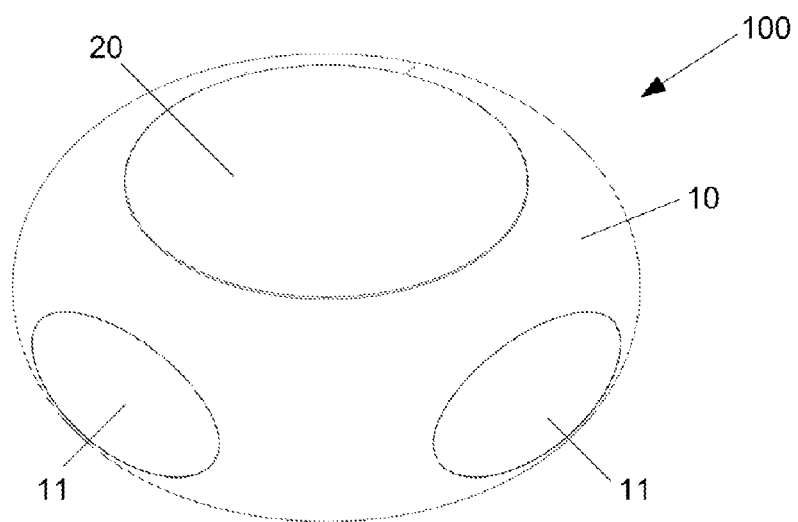
Figure 1a
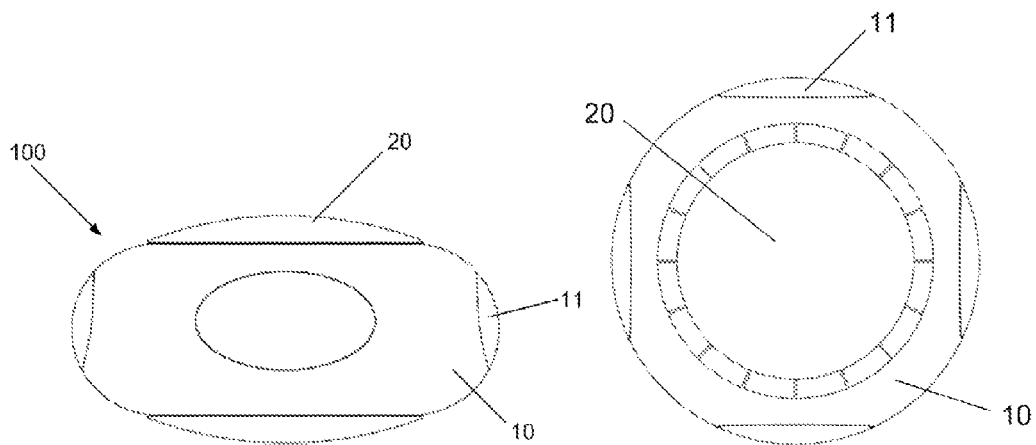
Figure 1bFigure 1c

POD FOR SPACE OR NEAR-SPACE FLIGHTS

CROSS-REFERENCE TO RELATED APPLICATIONS

This application is being filed under 35 USC 371 as a National Stage Application of pending International Application No. PCT/EP2009/065135 filed Nov. 13, 2009, which is hereby incorporated by reference herein in its entirety for all it teaches and discloses.

TECHNICAL FIELD

The present invention relates to human flight at great altitude, and more particularly to a pod for space and/or near-space flight.

BACKGROUND OF THE INVENTION

Human spaceflight has been around for many years. For example, U.S. Pat. No. 3,093,346 discloses a manned capsule which can be lifted into orbit by a launching motor. The capsule can subsequently return to Earth using a parachute system. Another example is known from U.S. Pat. No. 3,702,688 which discloses a booster vehicle to inject an orbiter into orbit. Both the booster vehicle and the orbiter are provided with crew compartments.

Human spaceflight has until recently been the exclusive domain of governmental or intern-governmental space agencies. However, at the end of the 1990's the phenomenon of space tourism emerged.

Until the day of today, about a handful of wealthy individuals have paid for a flight with a spacecraft to the International Space Station (ISS) and a subsequent stay in the ISS in orbit. These first "space tourists" paid in excess of 20 million US dollars for their trip. The fact that people are willing to pay large sums of money shows that there is a demand for space tourism. It is obvious however, that the demand for space tourism will be very small at these steep prices. Apart from the high prices, another factor that might discourage potential space tourists is the long training period necessary before being allowed to fly. Space tourists may further suffer discomfort when experiencing prolonged weightlessness.

Recently, a number of start-up companies have started developing spacecraft suitable for sub-orbital flight, in the hope of offering a more affordable trip to "space" and developing a profitable space tourism industry. In such a sub-orbital flight, a spacecraft would take-off from Earth, ascend to an altitude of approx. 100 km and return to Earth. An advantage of the sub-orbital flight compared to the orbital flight is that passengers would not need a long training period before being able to board. These sub-orbital flights are however still projected to be very costly. For example, presently Virgin Galactic offers tickets starting at 200.000 US dollars. Furthermore, with available jet and rocket technology, it can be foreseen that the emissions from these vehicles will be potentially damaging to the environment in general and the ozone layer in particular.

There is therefore still a need to develop spacecraft or space vessels that have the potential of making space tourism more affordable. There is furthermore a need to make space tourism more comfortable and a more enjoyable experience. And there is also a need to make space tourism less contaminating.

Therefore, commercially offering "near-space" flights (to an altitude of approx. 30-40 km above Earth) with the aid of a gondola suspended from a balloon has been proposed ["The role of Balloons in the future development of Space Tourism", J. Lopez-Urdiales, IAC-02-IAA.1.3.02, 53rd International Astronautical Congress, 10-19 Oct. 2002, Houston].

At such an altitude in the stratosphere (30-40 km), passengers will have a view of the curvature of the Earth, a bluish layer around the Earth (caused by Rayleigh scattering), a dark sky and the sun. After viewing the Earth from this altitude, the gondola may return to Earth using e.g. a parachute or parafoil-like structure. In this way, a very comfortable way of viewing the Earth is achieved. Compared to e.g. a stay in the ISS, this form of space tourism offers the promise of less contamination, and a cheaper and more comfortable trip. At the same time, this form of space tourism can provide the passengers with a very attractive viewing experience.

Similar balloon flights have been performed in a non-commercial manner in the past. U.S. Pat. No. 2,865,581 discloses a largely cylindrical gondola suspended from a balloon. The gondola offers a space for one passenger (scientist). U.S. Pat. No. 2,950,881 discloses a similar gondola, provided with two seats.

These prior art systems are hardly suitable for commercial flights: the space available for passengers is very small, the windows are very small (practically inevitable with the shape of the gondola), and although some shock absorbing structure has been provided to soften the landing, the trip will hardly be pleasant for passengers. In order to be able to commercially offer this kind of human stratospheric balloon flights, there is a need to provide a gondola (or cabin or other unit for hosting passengers) that is able to make such a flight more pleasant for passengers. There is furthermore a need to provide such a unit for hosting passengers that can comfortably descend to Earth from a certain altitude using a parafoil or parachute like structure. There is furthermore a need to provide such a unit that can make other (non-balloon) space-flight in orbit more pleasant. The present invention aims at resolving one or more of these needs and achieves this with a pod according to claim 1. A pod in its general sense is a detachable or self-contained unit on an aircraft, spacecraft, vehicle, or vessel, having a particular function (in the case of the present invention: hosting passengers and/or crew).

SUMMARY OF THE INVENTION

In a first aspect, the present invention provides a pod for flight to and/or from space or near-space, comprising a pressurized body for hosting passengers, said pressurized body having a substantially ring-like shape provided around a central axis and having a central opening, wherein said pressurized body comprises one or more windows. A ring-like shape in this sense is to be understood as any shape provided in a substantially circular manner around a central axis and foreseen of a central opening (a central "through-hole"). The cross-section of the ring may be of any shape, but preferably is at least rounded, such as oval, elliptical or substantially circular. The cross-section of the ring may be constant or may vary along the circumference of the circle. Such a ring-shaped pod has a suitable shape for withstanding internal pressure and thus creates the possibility of a relatively lightweight structure suitable for a stay in an environment of very low ambient pressure, such as the stratosphere or space. Furthermore, the ring-shape provides a suitable built-up to host a plurality of passengers.

The pressurized substantially ring-shaped body comprises an internal surface substantially facing said central axis, and an external surface, substantially facing away from said central axis. Preferably, one or more windows are provided on said external surface. On the external surface of the ring (surface facing away from the central axis), the stresses in the structure due to internal pressurization will generally be lower than on the internal surface of the ring. By predominantly providing the windows on the external surface, the stresses due to inevitable stress concentrations around the windows can be kept to a minimum. This makes it possible to provide relatively large windows for the viewing pleasure of the passengers. It even makes it possible to provide a single large window prescribing the entire circumference of the pressurized body. More preferably, with the goal of minimizing stresses, the windows are located on the part of the external surface furthest away from the central axis.

Optionally, the pod furthermore comprises a non-pressurized body connected to the pressurized body, wherein the connection between the pressurized body and the non-pressurized body comprises a motion damping structure. With such a design, most loads can then be introduced into the non-pressurized body. The passengers in the pressurized body will notice less disturbances.

Preferably in these embodiments, the non-pressurized body houses at least a first share of the operational equipment of the pod. Not all operational equipment needs to be pressurized. By providing some operational equipment in the non-pressurized body, more space will be available in the pressurized body for the passengers.

Preferably, the non-pressurized body comprises one or more impact attenuators for landing. Optionally, in these embodiments, said one or more impact attenuators comprise at least one airbag. If the impact attenuators are connected at the non-pressurized body, the impact on the pressurized body will be attenuated by the motion-damping connection between the pressurized body and the non-pressurized body.

In some embodiments, the non-pressurized body comprises a textile-based decelerator for descending. Said textile-based decelerator may e.g. comprise a parafoil or a parachute. Similarly as before, by connecting the decelerator at the non-pressurized body, the passengers in the pressurized body will notice the decelerations less.

Preferably, the non-pressurized body comprises at least a second share of the operational equipment of the pod.

Preferably, all systems relating to accelerating or decelerating the pod are connected to the non-pressurized body so that loads related to acceleration or deceleration are introduced into the pod via the non-pressurized body. One way of using the pod for space tourism that is foreseen consists in ascending to an altitude of between 30 km-40 km above the Earth with the help of a balloon. After a stay at this altitude, the pod returns to the Earth with the help of a parachute-like structure. For the landing on Earth, an airbag-like structure may be foreseen. In this case, accelerations experienced by the gondola may be caused by the balloon, the parachute or the airbags. By attaching these systems at the non-pressurized body, the loads related to these decelerations and accelerations are introduced into the pod in said non-pressurized body. By providing a motion-damping structure between the pressurized body (housing the passengers and optionally crew) and the non-pressurized body, the passengers will experience less sudden movements and shocks.

Optionally, and taking advantage of the ring-shaped pressurized body, the non-pressurized body may occupy at least partially the central opening of the pressurized body. A compact design for the whole pod can be achieved in this way. Alternatively, the non-pressurized body may be positioned substantially on top of or underneath the pressurized body. In another alternative embodiment, the non-pressurized body may be arranged partially circumferentially around the ring-shaped pressurized body.

In some embodiments of the invention, the outer structure of the pressurized body may comprise a substantially rigid structure. A rigid structure in this sense is to be understood as a structure that, regardless of the internal pressure, has substantially the same external shape of the body. In other embodiments of the invention, the outer structure of the pressurized body may comprise a substantially flexible inflatable structure. Such a flexible structure is to be understood as a structure takes its external shape mainly due to the internal pressure. Within the scope of the invention both types of structures may be used. The pressurized body is preferably formed by a single continuous body (i.e. a unitary construction), but alternatively may be composed of a plurality of interconnected ring segments.

In some embodiments of the invention, said pressurized body may comprise a shape obtained by revolving a geometrical figure around an axis of revolution external to that figure. An example of such a shape is a torus, which is obtained by revolving a circle around an axis of revolution. The advantage of a torus-shaped pod is that, while maintaining a suitable set-up for hosting passengers, stresses in the structure due to the pressurization may be minimized. In some embodiments, instead of a torus, the shape of the pod is obtained by revolving a more elliptical figure around an axis of revolution. As long as a substantially rounded geometrical figure is used, stresses in the structure can be kept relatively small. A slightly less rounded shape may be advantageous as well, depending on e.g. the interior design of the pod, the connection with the non-pressurized body etc.

In another aspect of the invention, the invention provides a vehicle for space or near-space flight comprising a pod as previously described and a balloon. In embodiments wherein the pod comprises both a pressurized body (for passengers) and a non-pressurized body, the balloon is preferably attached at the non-pressurized body. Preferably, the balloon is filled with e.g. helium or hydrogen.

In yet another aspect of the invention, the invention provides a pod comprising a pressurized body and a non-pressurized body connected to each other, wherein the connection between the pressurized body and the non-pressurized body comprises a motion damping structure, optionally comprising a guide on the non-pressurized body along which the pressurized body can move. Optionally, a pod according to this aspect of the invention may be substantially ring-shaped with a central opening. Optionally, the external surface of the ring-shaped pod (facing away from an external axis) may be provided with windows. Preferably, these windows are provided on the parts of the external surface that are furthest away from the central axis of the pod. Furthermore, a pod according to this aspect of the invention may comprise a similar structural lay-out (flexible or rigid), a similar division in pressurized and non-pressurized equipment and a similar landing system and similar decelerators as described before.

BRIEF DESCRIPTION OF THE DRAWINGS

Particular embodiments of the present invention will be described in the following, only by way of non-limiting example, with reference to the appended drawings, in which:

FIGS. 1a-1f illustrate embodiments of a first type of pod according to the present invention;

DETAILED DESCRIPTION

Figure 1D:
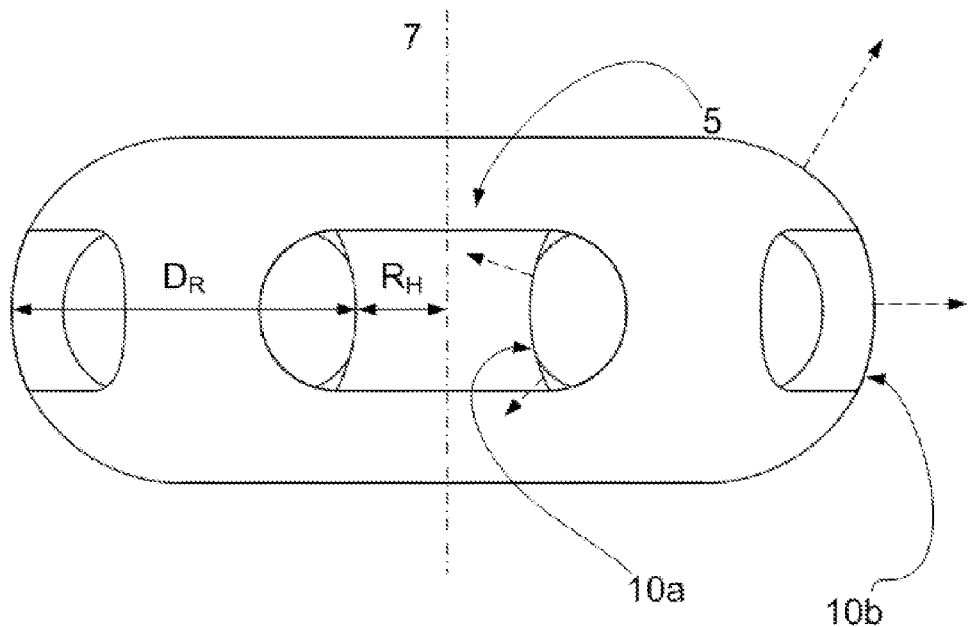
Figure 1E:
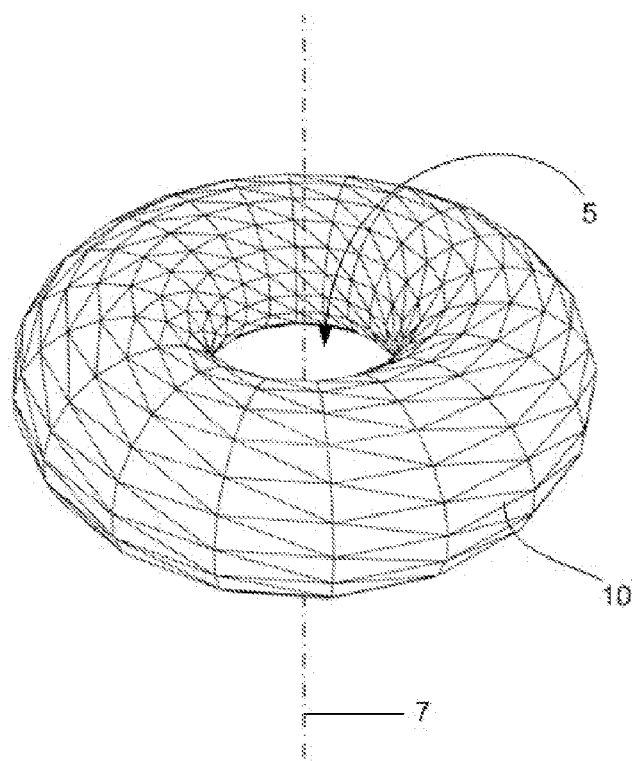

FIGS. 1a-1f illustrate embodiments of a first type of pod according to the present invention. A pod 100 according to the present invention comprises a pressurized body 10 for hosting passengers ("space tourists" and optionally pilots and further crew). Said pressurized body is provided with a plurality of windows 11. The pressurized body 10 in this embodiment is formed by a toroid (or "donut" shape), more clearly illustrated in FIGS. 1d and 1e.

The toroid is formed around a central axis of revolution 7. In the central opening, indicated with reference sign 5 in FIG. 1e, the non-pressurized body 20 may be located.

The windows 11 have advantageously been provided on the external surface 10b of the pressurized body (the part of the surface of the pressurized body that faces away from the central axis 7). The stress concentrations around the windows 11 will be relatively small, since the prevailing stresses in the external surface 10b are smaller than in the internal surface 10a (the part of the surface substantially facing towards the central axis 7). Large windows may thus be provided for the viewing pleasure of the passengers. At the same time, due to the shape of the pressurized body, a secure lightweight structure may still be achieved.

This is further illustrated with reference to FIG. 1f. FIG. 1f illustrates a distribution of stresses in a part of the pressurized body without windows and a structure of constant thickness. The lines indicated in FIG. 1f are lines of constant Von Mises stress. The stresses are normalized with respect to the maximum Von Mises stress which is found in the centre line of the internal surface of the toroid. In this area of the pressurized body, the stresses are the largest.

It can further be seen in FIG. 1f that, assuming constant material thickness of the structure of the pressurized body, the stresses are approximately 60% lower (or more) on the external surface of the pressurized body. It is thus advantageous to provide windows on the external surface, and most advantageous to provide them on the part of the external surface furthest away from the central axis.

Figure 1F:
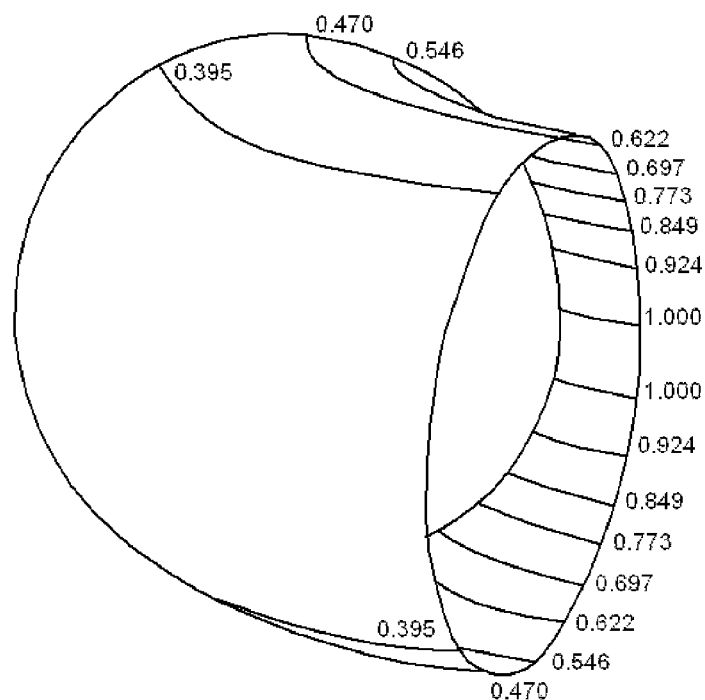

The windows 11 in FIGS. 1a-1c have been indicated to be elliptical, but within the scope of the present invention, any suitable shape may be chosen. In FIG. 1d, the pressurized body has the same toroid shape but is provided with slightly different windows. It will be clear that a generally rounded shape of the windows will limit stress concentrations.

The pod according to the present invention may furthermore comprise a non-pressurized body 20. Both the pressurized body 10 and the non-pressurized body 20 may comprise operational equipment for the pod. Equipment that generally does not need to be pressurized and does not otherwise directly serve for passengers or crew in the pressurized body, may be provided in the non-pressurized body, thus saving space in the pressurized body for passengers.

Operational equipment of the pod may comprise e.g. one or more of the following: power subsystem (e.g. batteries), thermal control system (e.g. radiators, heaters, cold plates, circulation pumps, heat-exchanger, control instruments), Environmental Control and Life Support System (ECLSS comprising e.g. oxygen tanks, filters, dehumidifiers, control system), communication system (e.g. transponder, antennas, displays), pod instruments (e.g. GPS, altimeter, avionics), descent system (e.g. parachute), ascent system (e.g. balloon), impact attenuating landing system (e.g. airbags).

Some of the equipment that may be provided in the non-pressurized body may include e.g.: parachute, radiators, cold plates, pumps and antennas.

In FIG. 1d, reference is made to the central radius $R_H$ of the opening or "through-hole" and the diameter $D_R$ of the cross-section of the ring-shaped pressurized body. As was mentioned before, in this embodiment, the pressurized body is formed by a toroid. In one embodiment of the present invention, the radius $R_H$ of the opening in the central part may be approximately 0.25 meter, and the diameter $D_R$ of the ring-shaped body may be approximately 2.5 meters. The external diameter of the pod in this embodiment would thus be approximately 5.5 meters. With these dimensions, the interior of the pressurized body may be designed in such a way that passengers may (almost) stand up straight.

Typically, the pod may have an external diameter of between approximately 4 meters and approximately 7 meters. Within the scope of the present invention, these dimensions may however be freely varied. The external diameter of the pod may vary e.g. depending on the number of passengers, but also on the selected type of cross-section of the pressurized body, see also FIGS. 2a-2e.

Figure 2A:
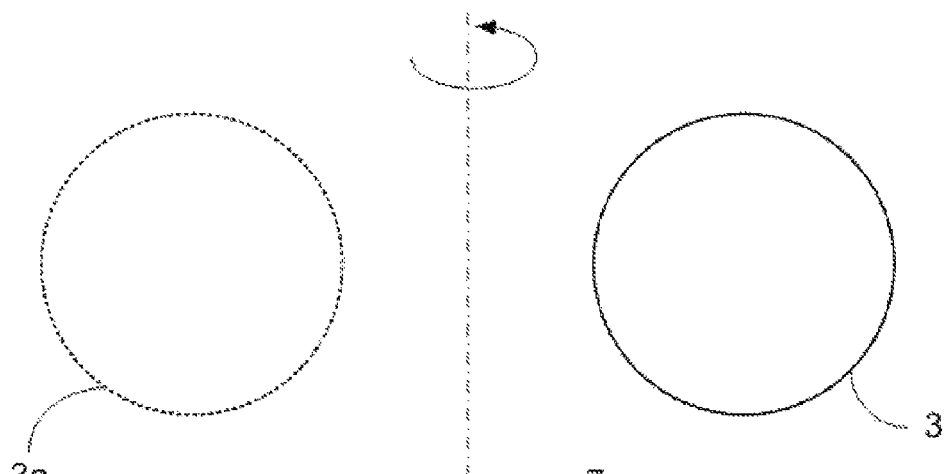
FIGS. 2a-2e illustrate a number of possible shapes of the pressurized body of a pod according to the present invention.

FIGS. 2a-2e illustrate various possible shapes of the pressurized body of the pod according to the present invention. In FIG. 2a, the shape of the pressurized body is a toroid, imaginarily formed by revolving a circle 3 around a central axis of revolution 7. Such a shape for the pressurized body is highly suitable for withstanding internal pressurization.

Figure 2B:
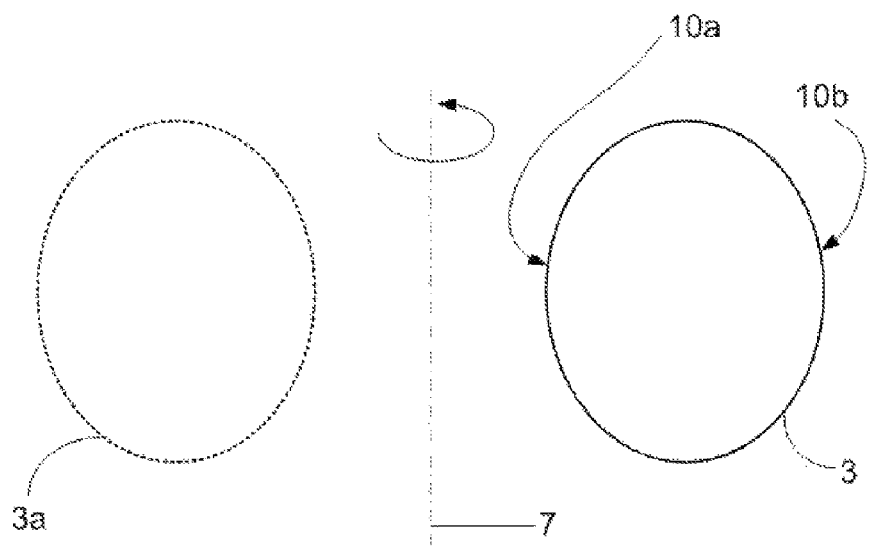
Figure 2C:
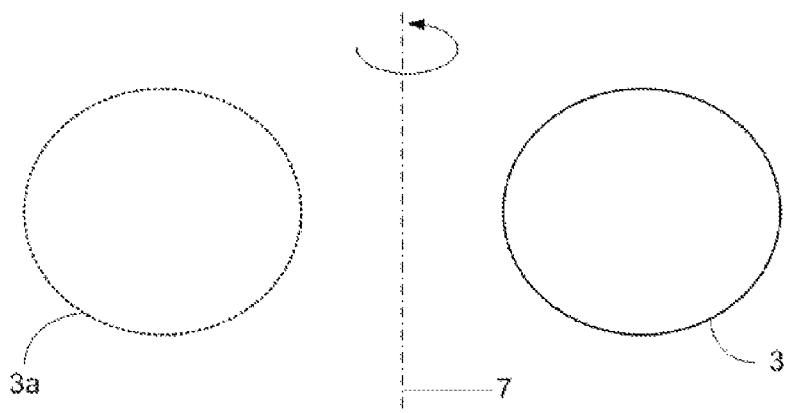
Figure 2D:
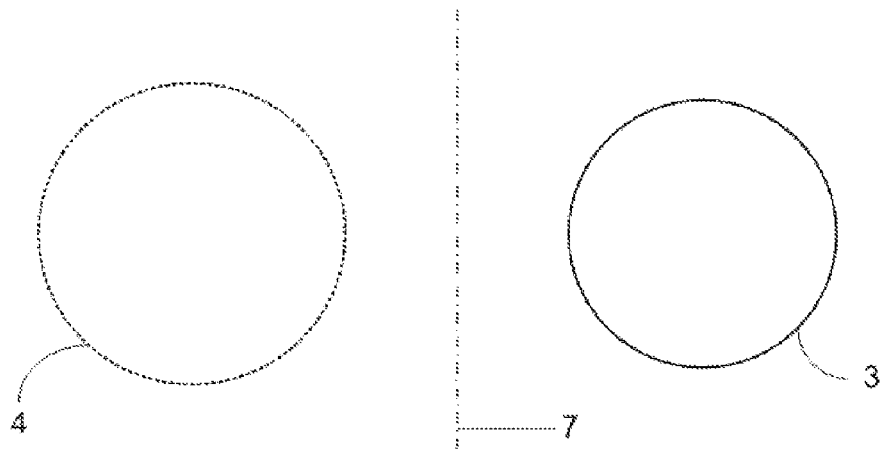
Figure 2E:
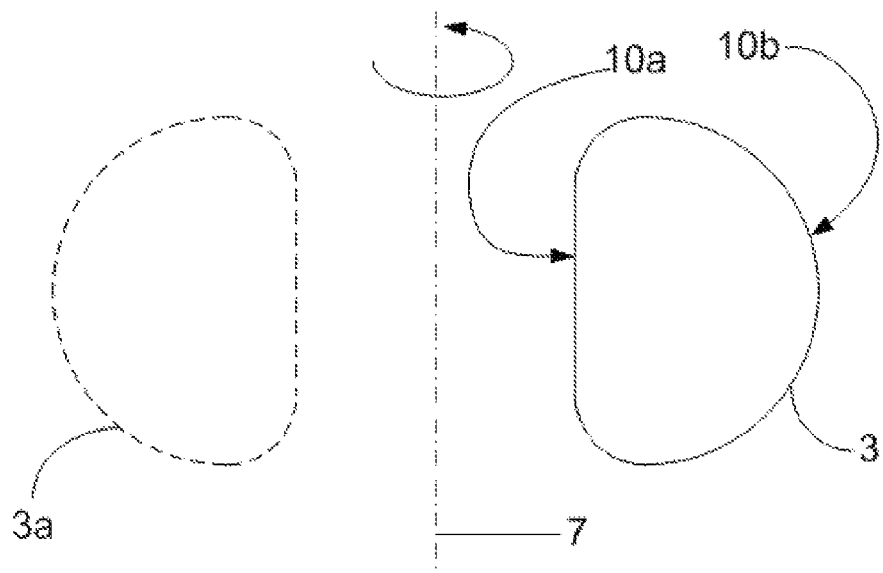

In FIGS. 2b and 2c, the shape of the pressurized body is determined by the revolution of ellipses 3 around central axis 7. These are other suitable shapes for the pressurized body 10. In FIG. 2d, the pressurized body is also substantially ring-shaped with a central opening. However, the pressurized body is not entirely rotationally symmetrical. The cross-sections are circular, but they are not all of the same size. Finally, FIG. 2e, illustrates yet another possible embodiment. In FIG. 2e, the pressurized body once again comprises the body of a solid of revolution. The shape 3 revolved around axis 7 is however less circular. It should be clear that within the scope of the present invention, the shape of the pressurized body may be varied. In accordance with specific requirements of e.g. number of passengers, interior decoration, number and shape of windows, structural lay-out of the pod, the most adequate shape for the pod may vary. Reference signs 10a and 10b have once again been used to indicate the internal surface and external surface respectively.

One advantage of providing a substantially ring-shaped pressurized body is that, in the central opening, a non-pressurized body may be arranged (see e.g. previous FIG. 1 and next FIG. 3).

Figure 3A:
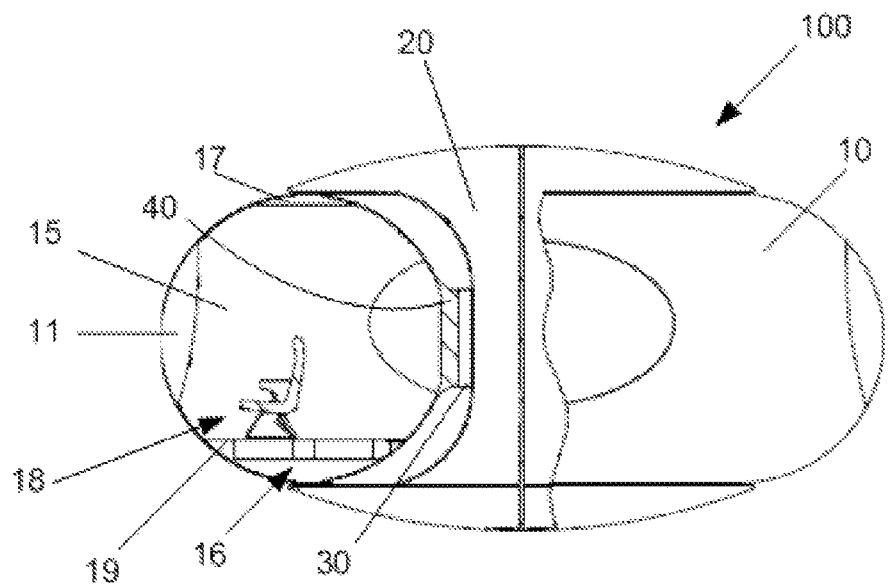
FIGS. 3a-3c illustrate the structure of embodiments of pods according to the present invention.
Figure 3B:
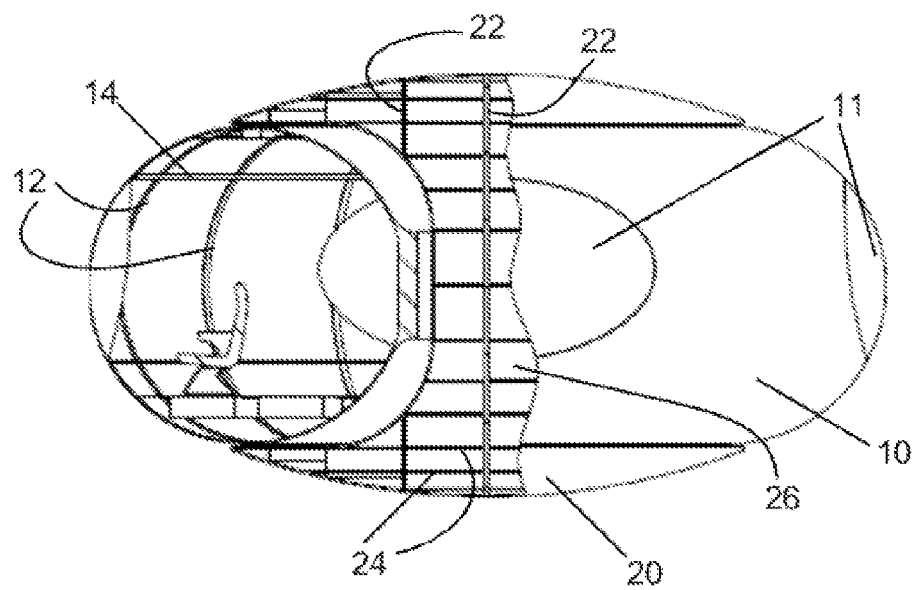
Figure 3C:
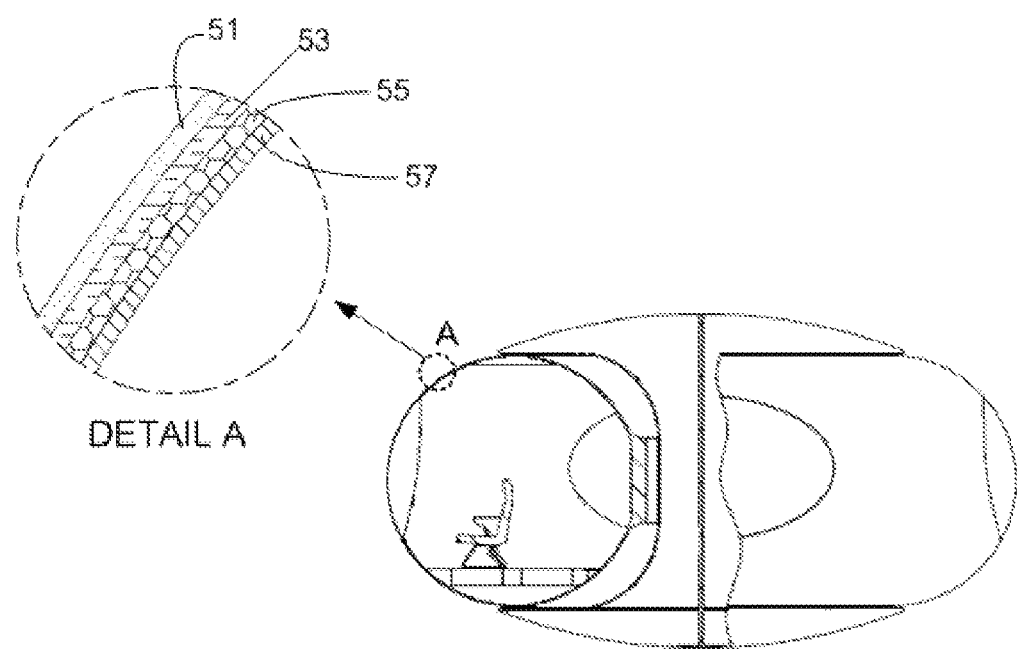

FIGS. 3a-3c illustrate the structure of embodiments of pods according to the present invention. FIG. 3a provides a view of a pod, of which one half is cut-open. One possible internal configuration of the pressurized body 10 is illustrated. In the internal 15 of the pressurized body, a plurality of seats 18, preferably all facing the windows, may be located on floor 19. Furthermore, an upper compartment 17 and a lower compartment 16 for housing operational equipment have been provided. In some embodiments of the invention, seats 18 are provided along 360° of the ring-shaped pressurized body. In other embodiments, seats 18 may be provided only along certain parts of the pressurized body.

Reference sign 30 schematically indicates a motion-damping structure provided between non-pressurized body 20 and pressurized body 10. Reference sign 40 indicates an interface between the motion-damping structure 30 and the curved surface of the pressurized body 10. The motion-damping structure 30 is advantageous in that loads due to accelerations/decelerations experienced by non-pressurized body 20 are felt to a lesser extent by the passengers in pressurized body 10. In some embodiments of the present invention, the systems that may be used to accelerate or decelerate the pod (e.g. airbags, parachute etc.) are therefore connected to the pressurized body 20.

In FIG. 3a, the motion damping structure 30 connecting the pressurized body 10 to the non-pressurized body 20 is schematically shown to be provided in a central part of the pod. However, within the scope of the present invention, the motion damping structure 30 may be provided e.g. more on the bottom part of the pod, or along substantially the entire altitude of the pressurized body. The motion damping structure 30 may furthermore consist of a single integral structure, or comprise various independent parts (e.g. two or three or more parts, a part substantially in the centre of the pod, one or more parts at the bottom and one or more at the top, or multiple parts along the circumference of the non-pressurized body).

The motion damping structure may furthermore be of any suitable design. Some suitable damping structures may comprise e.g. a spring+damper configuration or a viscous fluid damper, an inflated deformable structure etc. In advantageous embodiments, the pressurized body 10 may move over one or more guides on the non-pressurized body 20 to dampen the shocks experienced by the passengers.

FIG. 3b illustrates a possible structural lay-out of a pod. The structure of the pressurized body 10 may be substantially rigid (i.e. regardless of the internal pressure, the external shape of the body is substantially the same) or may be substantially flexible (i.e. only when pressurized, the external shape is substantially that of the pressurized body in operation. In the case of FIG. 3b, a toroid).

Regardless of whether the pressurized body 10 is of a substantially rigid or of a substantially flexible structure, several reinforcements may be foreseen. FIG. 3b illustrates the possibility of providing ribs 12. Ribs 12 provide stiffness and strength along the circumference of vertical cross-sections of the torus of the pressurized body 10. Stringers 14 provide stiffness and strength along the circumference of horizontal cross-sections of the torus of the pressurized body 10.

Also the non-pressurized body may be foreseen with vertical frames or stiffeners 22, and horizontal frames or stiffeners 24. Compartments 26 for housing equipment that does not need to be pressurized are provided in this embodiment.

It should be clear, that number, shape, direction of the reinforcements (such as stringers, stiffeners, ribs) may be varied within the scope of the present invention. Preferably, at least the structure directly surrounding the window(s) may be reinforced.

If the pressurized body is of a substantially rigid structure, suitable materials include e.g. a fibre-reinforced composite, such as a composite material of Kevlar™ or carbon fibres and a resin. The ribs, stiffeners and stringers may be made of the same material or of another suitable material. The pressurized body of composite material may also comprise certain metallic parts.

The windows are preferably made of polycarbonate or a material of similar characteristics. In some embodiments, the windows may comprise "double-glazing" for thermal insulation: two material layers (polycarbonate or similar), with air in between the two layers. The windows may be foreseen of one or more coatings, such as a UV coating, and/or a neutral density filter (to reduce the intensity of the sunlight inside the pod), and/or an anti-freeze coating.

In FIG. 3c, an embodiment of the invention, wherein the pressurized body 10 comprises a substantially flexible inflatable shape: the pressurized body assumes its desired shape under pressure, whereas the outer structure is mostly textile-based. Detail A in FIG. 3c highlights one possible composition of the flexible structure of the pressurized body: an inner layer 57 mainly serves for sealing the pressurized body. Next layer 55 mainly serves for providing mechanical strength, and may be made of e.g. Kevlar™, another composite material containing fibres, or another suitable material. Then a thermal insulation layer 53 is provided. This thermal insulation layer may e.g. comprise a structure similar to MLI (Multi-Layer Insulation), regularly used on satellites. Finally, in this embodiment, an outer UV protection layer 51 is provided to shield the other layers.

Within the scope of the present invention, the material of the layers, the number of layers and their order may be varied. Although in FIG. 3c, no stringers or ribs are shown, it should be clear that they may also advantageously provided in this embodiment. They were left out of FIG. 3c only for reasons of clarity. But in fact, especially in the case wherein the pressurized body comprises an inflatable structure, ribs etc. may serve to provide the desired external shape of the pod.

Figure 4A:
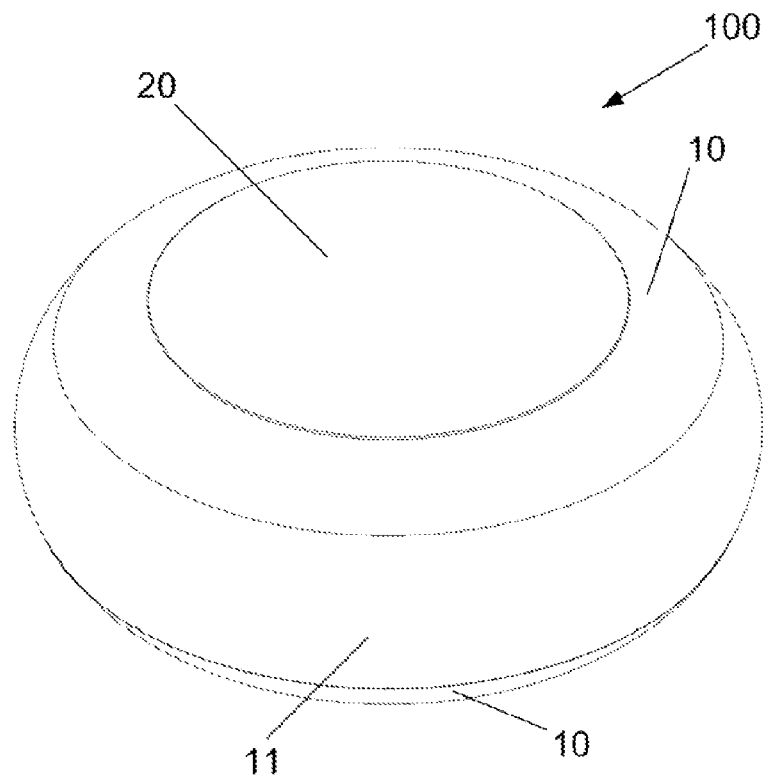
FIGS. 4a-4c illustrate another embodiment of a pod according to the present invention.
Figure 4B:
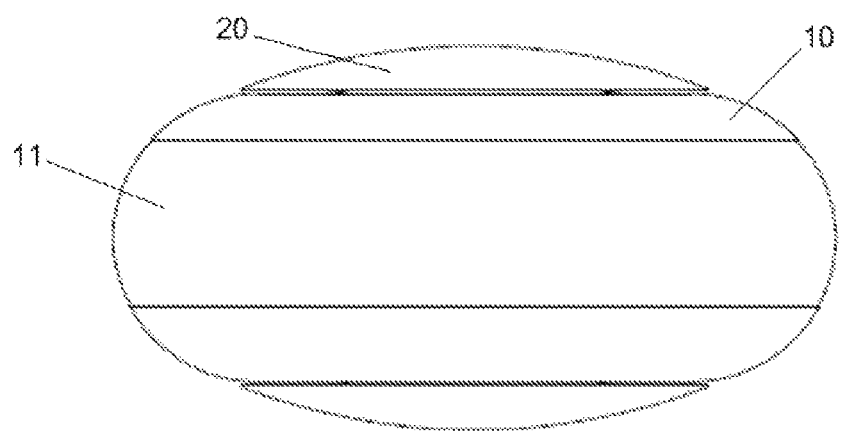
Figure 4C:
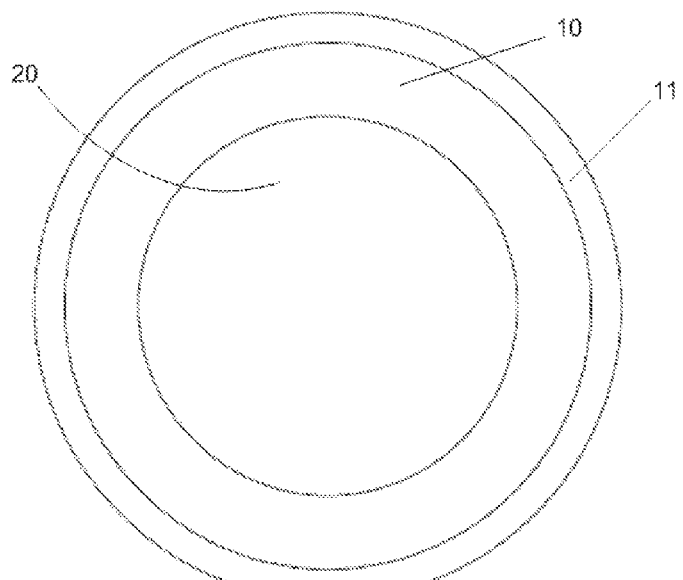

FIGS. 4a-4c illustrate another embodiment of a pod according to the present invention. In this embodiment, pod 100 comprises a pressurized body 10 and a non-pressurized body 20 as previously shown. However, in this embodiment, a single window 11 is provided around the entire circumference of the pressurized body. This embodiment is aimed at maximising the viewing pleasure of the passengers. Due to the shape of the pressurized body 10, such a window is made possible. The shape of the pressurized body in this case is once again a toroid: the structure of the pressurized body on the "internal surface" of the toroid (the part of the toroid facing the central axis) provides the strength to be able to support a window on the "external surface" of the toroid.

Thus in the case of FIG. 4, the window is arranged along 360° (or 100%) of the external diameter. Typically in other embodiments of the invention, the plurality of windows may be arranged so as to occupy at least 25% of the external diameter of the pressurized body, i.e. the windows together occupy an arc of at least 90°. It is estimated that with windows of this size, reinforcements may be kept to a minimum. At the same time, enough window surface may be provided for the passengers. In preferred embodiments, the plurality of windows occupies approximately 70% of the external diameter.

Figure 5:
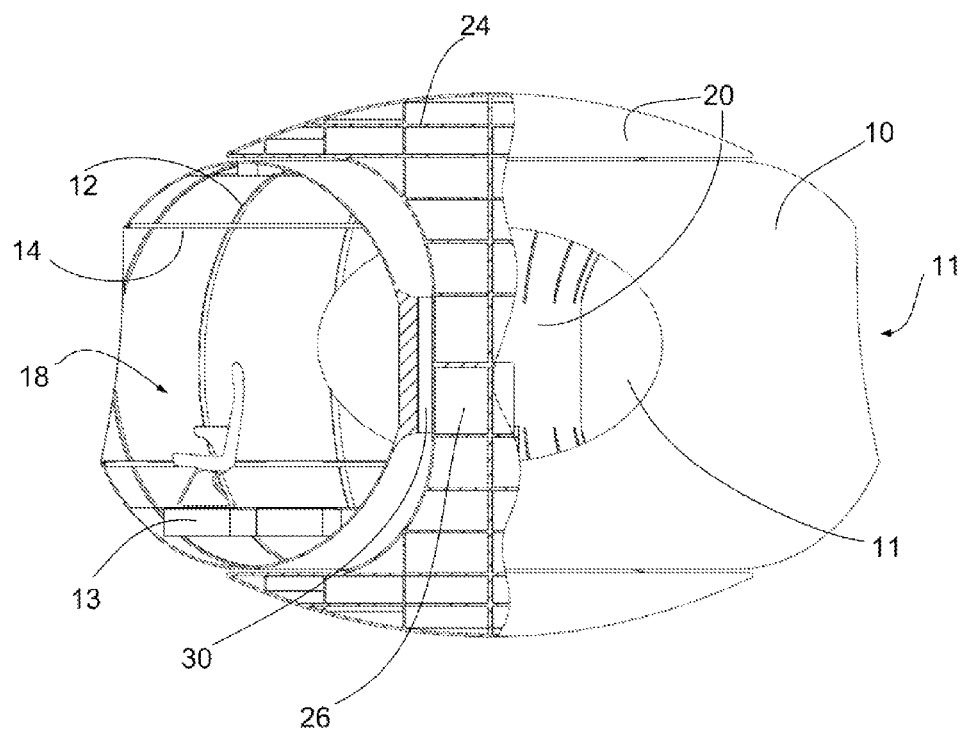
FIG. 5 illustrates yet another embodiment of a pod according to the present invention.

FIG. 5 illustrates another embodiment of the present invention. The pressurized body is once again ring-shaped. However, the cross-section of the pressurized body is elliptical (instead of circular as before). In the central hole of the ring, the non-pressurized body 20 is provided. A shock absorbing structure 30 is provided between the pressurized body 10 and non-pressurized body 20.

Similarly as before, ribs 12 and stringers 14 are provided on the surface of the pressurized body. Seats 18 for passengers are provided as before. Compartments 13 for housing equipment that needs to be pressurized and compartments 26 for housing equipment that does not need to be pressurized have been provided. A plurality of windows 11 has also been indicated.

Figure 6A:
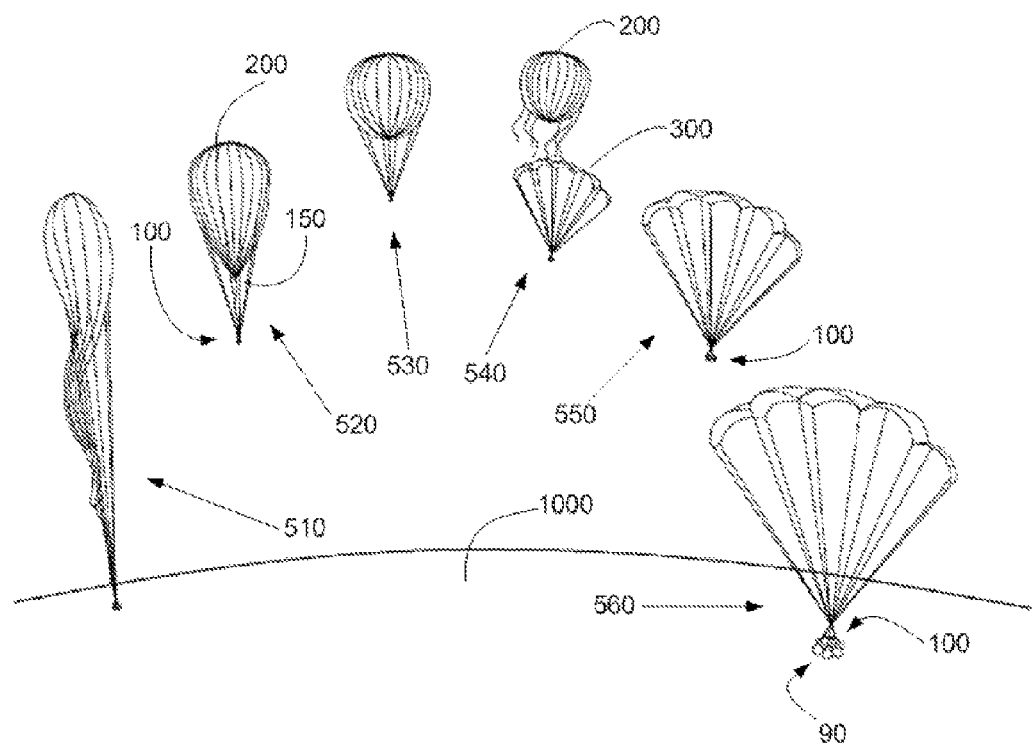
FIGS. 6a and 6b illustrate two possible uses of a pod according to the present invention for space tourism.
Figure 6B:
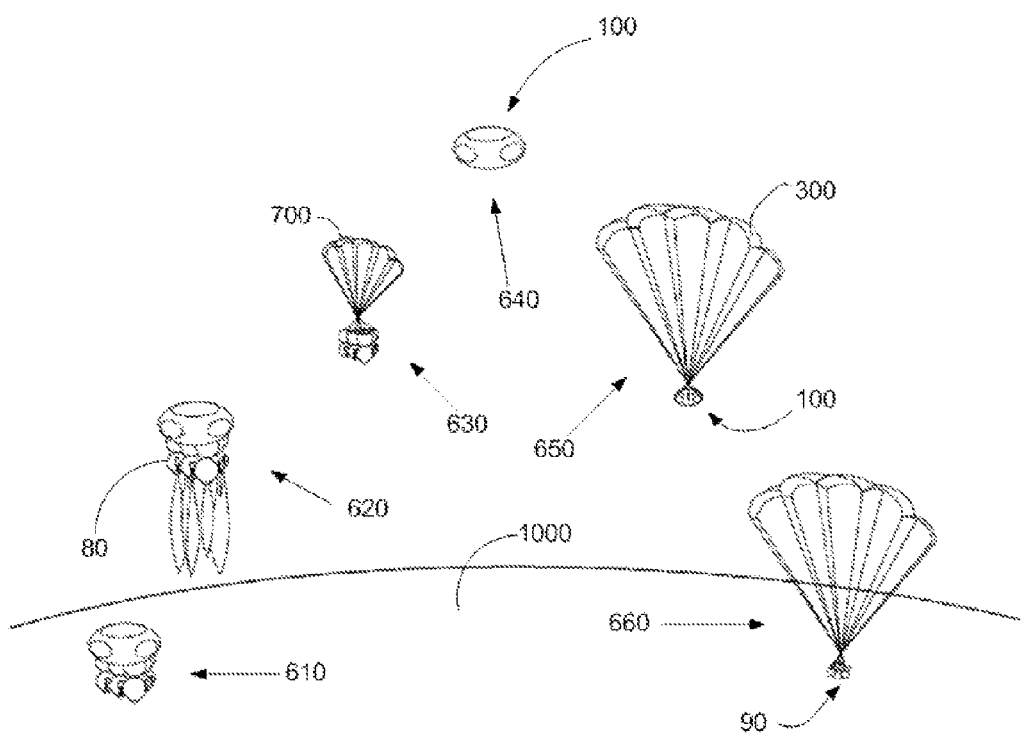

FIGS. 6a and 6b illustrate two possible uses of a pod according to the present invention for space tourism. In FIG. 6a, space tourism is practiced by ascending with a balloon to a altitude of between 30 km and 40 km, preferably around 36 km. A flight to these altitudes is generally referred to as a "near space" flight. After viewing the Earth from this altitude, the pod can return to Earth using a parachute, or another textile-based decelerator (such as e.g. a parafoil structure).

With reference to FIG. 6a, at a first stage 510, the pod 100 with balloon 200 takes off from Earth. A suitable balloon may e.g. be filled with helium or with hydrogen to be able to perform this kind of flight. A suitable structure 150 (e.g. comprising a plurality of chains) connects the balloon to the pod. At a second stage 520, the balloon and pod are at cruising altitude of preferably between 30 and 40 km, more preferably around 36 km. The balloon and pod can stay at this altitude for a prolonged period of time of e.g. some 2 hours. Shorter and longer stays are also possible.

At a next stage 530, the balloon is vented to start the descent to a designated landing area. At stage 540, the balloon is separated from the pod and the pod may experience a short time of free-fall. The passengers will experience zero gravity for this short period of time. Then, the parachute (or parafoil, or other similar structure) 300 is unfolded and a controlled descent towards the surface of the Earth 1000 follows. It should be noted that such a period of free-fall is optional, i.e. the decelerator may be opened immediately upon separation of the balloon. Stage 550 is used to illustrate the descent to the Earth with a parachute.

Stage 560 illustrates the landing of the pod 100 (with parachute 300) at the Earth 1000. Impact attenuators 90 (which in this case have been schematically indicated as airbag-like systems) may be provided on the bottom of the pod to limit the instantaneous deceleration of the pod at the moment it touches the ground. Alternatively to airbags, other impact attenuators could also be used: e.g. a deformable (non-inflatable) structure or a system comprising fluid dampers.

In preferred embodiments of the invention, the impact attenuators 90, and/or the parachute are attached at the non-pressurized part of the pod. Through a motion damping structure between the pressurized part and the non-pressurized part, the accelerations/decelerations experienced by the passengers in the pressurized part of the pod are reduced. This may make the flight and landing more comfortable for the passengers.

FIG. 6b illustrates another way of space tourism, wherein the pod is elevated to higher altitudes, e.g. more than 100 km by means of e.g. a rocket. This kind of flight can be referred to as an actual "space" flight (instead of "near space" mentioned previously). A goal of the present invention is to make space tourism more enjoyable also in this method.

The pod 100 is shown in a first stage 610, prior to take-off from Earth 1000. The pod is attached to a propulsion system 80 to be able to ascend to appropriate altitudes. Alternatively, the pod may be carried as payload by a suitable spacecraft.

Stage 630 shows the propulsion system returning to Earth with the aid of a parafoil 700 (or another type of textile-based decelerator).

Stage 640 shows the pod in a free-fall trajectory. Stage 650 shows the pod returning to Earth in a controlled manner, using a decelerator 300 (which may preferably be textile based as before). At stage 660, the pod lands on Earth again. Similarly as before, airbag-like structures 90, have been schematically indicated to represent impact attenuators provided on the bottom of the pod. As before, these impact attenuators are preferably connected at the non-pressurized part of the pod.

The pod according to the present invention may be advantageously used both in space flight and in near-space flight. The design of the pod for a space flight may slightly differ from a pod for a near-space flight, to take into account the difference in loads mainly due to larger accelerations in space flight.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A pod for flights to and/or from space or near-space, comprising:
    a pressurized body configured to host passengers therein,
    said pressurized body having a substantially ring-like shape provided around a central axis and having a central opening, wherein
    said pressurized body comprises an internal surface substantially facing said central axis, and an external surface substantially facing away from said central axis, and
    wherein one or more windows are provided substantially along the part of said external surface furthest away from the central axis, and
    wherein said substantially ring-like shape is a toroid;
    wherein the non-pressurized body comprises a textile-based decelerator for descending, wherein said textile-based decelerator comprises a parafoil or a parachute.

2. A pod according to claim 1, wherein said one or more windows are provided along at least approximately 25% of the external diameter of the pressurized body, or along at least 45% of the external diameter of the pressurized body, or along approximately 70% of the external diameter of the pressurized body.

3. A pod according to claim 1, wherein the pod furthermore comprises a non-pressurized body connected to the pressurized body, wherein the connection between the pressurized body and the non-pressurized body comprises a motion damping structure.

4. A pod according to claim 3, wherein the non-pressurized body comprises at least one guide and the pressurized body is arranged in such a way that it can perform a limited movement along said guide.

5. A pod according to claim 3, wherein said non-pressurized body at least partially occupies the central opening of said pressurized body, said non-pressurized body houses at least one or more of: a radiator, cold plates, an antenna.

6. A pod according to claim 3, wherein the non-pressurized body comprises one or more impact attenuators for absorbing an impact at landing, wherein said one or more impact attenuators comprise at least one airbag.

7. A pod according to claim 3, wherein all systems relating to accelerating or decelerating the pod are connected to the non-pressurized body so that loads related to acceleration or deceleration are introduced into the pod via the non-pressurized body.

8. A pod according to claim 1, wherein an outer structure of the pressurized body comprises a substantially rigid structure.

9. A pod according to claim 1, wherein an outer structure of the pressurized body comprises a substantially flexible inflatable structure.

10. A pod according to claim 1, wherein said pressurized body comprises a shape obtained by revolving a geometrical figure around an axis of revolution external to that figure, wherein said geometrical figure is a circle, such that the external shape of the pressurized body of the pod is a torus, or wherein said geometrical figure is an ellipse.

11. A pod according to claim 1, wherein said pressurized body comprises a plurality of interconnected ring segments.

12. A vehicle for space or near-space flight comprising:
 a detachable balloon that is detachable from the vehicle; and
 a pod for flights to and/or from space or near-space, the pod comprising a pressurized body configured to host passengers therein,
 said pressurized body having a substantially ring-like shape provided around a central axis and having a central opening, wherein
 said pressurized body comprises one or more windows, and
 said substantially ring-like shape is a toroid.

13. A vehicle according to claim 12, wherein said balloon is filled with helium.

14. A vehicle according to claim 12, further comprising a textile-based decelerator.

15. A vehicle according to claim 12, wherein the pod furthermore comprises a non-pressurized body connected to the pressurized body, wherein said balloon is connected to the non-pressurized body.

16. A method of using a vehicle according to claim 12 comprising flying said vehicle to an altitude of between 30 km and 40 km.

17. The method of claim 16, further comprising separating the balloon from the pod after the vehicle reaches a desired altitude, such that the vehicle does not include the balloon anymore.

18. The method of claim 17, wherein after separating the balloon from the pod, the method further comprising descending the pod to Earth using a textile-based decelerator.

19. A pod for flights to and/or from space or near-space, comprising
 a pressurized body configured to host passengers therein, said pressurized body having a substantially ring-like shape provided around a central axis and having a central opening; and
 a non-pressurized body connected to the pressurized body, wherein the connection between the pressurized body and the non-pressurized body comprises a motion damping structure, and
 wherein said substantially ring-like shape is a toroid;
 wherein the non-pressurized body comprises a textile-based decelerator for descending, wherein said textile-based decelerator comprises a parafoil or a parachute.

20. A pod according to claim 19, wherein the non-pressurized body comprises at least one guide and the pressurized body is arranged in such a way that it can perform a limited movement along said guide.

21. A pod according to claim 19, wherein said non-pressurized body at least partially occupies the central opening of said pressurized body, said non-pressurized body houses at least one or more of the following: radiators, cold plates, antennas.

22. A pod according to claim 19, wherein the non-pressurized body comprises one or more impact attenuators for absorbing an impact at landing, wherein said one or more impact attenuators comprise at least one airbag.

23. A pod according to claim 19, wherein all systems relating to accelerating or decelerating the pod are connected to the non-pressurized body so that loads related to acceleration or deceleration are introduced into the pod via the non-pressurized body.

24. A pod according to claim 19, wherein said pressurized body comprises a plurality of interconnected ring segments.

* * * * *